(12) United States Patent
Freeman

(10) Patent No.: US 11,604,293 B2
(45) Date of Patent: Mar. 14, 2023

(54) BORON TRIFLUORIDE AS A QUENCH GAS FOR NEUTRON PROPORTIONAL COUNTERS

(71) Applicant: Baker Hughes Holdings LLC, Houston, TX (US)

(72) Inventor: Christopher Freeman, Twinsburg, OH (US)

(73) Assignee: Baker Hughes Holdings LLC, Houston, TX (US)

( * ) Notice: Subject to any disclaimer, the term of this patent is extended or adjusted under 35 U.S.C. 154(b) by 33 days.

(21) Appl. No.: 17/401,988

(22) Filed: Aug. 13, 2021

(65) Prior Publication Data
US 2023/0045923 A1 Feb. 16, 2023

(51) Int. Cl.
*G01T 3/00* (2006.01)
(52) U.S. Cl.
CPC .................................... *G01T 3/008* (2013.01)
(58) Field of Classification Search
CPC G01T 3/00; G01T 3/008; G01T 1/185; G01T 1/18; G01T 1/205; H01J 47/12; H01J 47/06; H01J 47/02; H01J 47/08; H01J 47/005
See application file for complete search history.

(56) References Cited

U.S. PATENT DOCUMENTS

| | | | | |
|---|---|---|---|---|
| 3,102,198 A * | 8/1963 | Bonner | ................... | H01J 47/12 376/153 |
| 3,240,971 A | 3/1966 | Morgan | | |
| 3,702,409 A | 11/1972 | Goodings et al. | | |
| 8,791,421 B2 | 7/2014 | Li et al. | | |
| 9,847,215 B2 * | 12/2017 | Degtiarenko | ........... | G01T 1/185 |
| 10,197,686 B1 * | 2/2019 | Troxler | .................... | G01T 3/008 |
| 2014/0117246 A1 * | 5/2014 | Zhou | ........................ | G01T 3/008 250/374 |
| 2015/0001413 A1 * | 1/2015 | Giomataris | ............. | G01T 3/008 250/391 |
| 2017/0307768 A1 * | 10/2017 | Troxler | .................... | G01V 5/10 |
| 2018/0045848 A1 * | 2/2018 | Justus | ..................... | G01T 3/008 |

FOREIGN PATENT DOCUMENTS

| | | |
|---|---|---|
| JP | 59-105589 A | 6/1984 |
| WO | 2014179695 A1 | 11/2014 |

OTHER PUBLICATIONS

D. Mazed, et al., "Design parameters and technology optimization of 3He-filled proportional counters for thermal neutron detection and spectrometry applications," Radiation Measurements, vol. 47, Issue 8, pp. 577-587 (2012).

* cited by examiner

*Primary Examiner* — Marcus H Taningco
(74) *Attorney, Agent, or Firm* — Mintz Levin Cohn Ferris Glovsky and Popeo, PC

(57) ABSTRACT

A neutron proportional counter is provided. The proportional counter can include a chamber and a gas mixture. The chamber includes an anode and a cathode. The gas mixture is contained within the chamber and includes at least one neutron sensitive fill gas and a quench gas including $BF_3$. In certain embodiments, the neutron sensitive fill gas can be configured for detection of thermal neutrons (e.g., He-3), fast neutrons (e.g., He-4, $H_2$), or both (e.g., $UF_6$).

18 Claims, 2 Drawing Sheets

Providing a neutron proportional counter chamber including an anode and a cathode, 202

Filling the chamber with a gas mixture including at least one neutron sensitive fill gas and a quench gas including $BF_3$, 202

FIG. 2

BORON TRIFLUORIDE AS A QUENCH GAS FOR NEUTRON PROPORTIONAL COUNTERS

BACKGROUND

Ionizing radiation is a type of energy released by atoms in the form of electromagnetic waves (e.g., gamma rays, X-rays) or particles (e.g., neutrons, alpha particles, beta particles) during disintegration of atomic nuclei. Sources of ionizing radiation are found in nature (e.g., radioactive materials in soil, water, air, cosmic rays, etc.), as well as man-made sources (e.g., nuclear power generation, medical radiation, etc.)

SUMMARY

Gaseous ionization detector are radiation detection instruments used in particle physics to detect the presence of ionizing radiation particles, as well as in radiation protection to measure ionizing radiation. Proportional counters are a type of gaseous ionization detector and are commonly used when discrimination between types of radiation (e.g., alpha vs. beta particles) is desired, as well as circumstances where pre-electrical signal amplification, improved signal-to-noise ratio, and/or enhanced noise discrimination is desired.

Embodiments of the disclosure provide an improved proportional counter and corresponding methods. As discussed in detail below, the proportional counter includes a novel gas mixture that provides the improved detection sensitivity (e.g., sensitivity to thermal neutrons), as compared to proportional counters employing conventional gas mixtures.

In an embodiment, a neutron proportional counter is provided. The proportional counter can include a chamber and a gas mixture. The chamber can include an anode and a cathode. The gas mixture can be contained within the chamber and the gas mixture can include at least one neutron sensitive fill gas, and a quench gas including $BF_3$.

In another embodiment, the fill gas can have a thermal neutron absorption cross-section within the range from about 100 to 5600 barns.

In another embodiment, the fill gas can have a fast neutron total cross-section within the range from about 1 to 8 barns In another embodiment, the fill gas can be He-3. He-3 can be present in the gas mixture in an amount sufficient to provide a partial pressure within the range from about 1.5 Psia to about 150 Psia.

In another embodiment, the fill gas can be at least one of He-4, $H_2$, or $UF_6$.

In another embodiment, the gas mixture can further include at least one stopping gas configured to reduce the mean free path of primary ions within the gas mixture. In another embodiment, the stopping gas can be at least one of Ar, Kr, or Xe.

In another embodiment, $BF_3$ can be present in the gas mixture in an amount sufficient to provide a partial pressure within the range from about 0.002 Psia to about 3.9 Psia.

In an embodiment, a method of preparing neutron proportional counter is provided. The method can include providing a neutron proportional counter. The proportional counter can include a chamber comprising an anode and a cathode, and filling the chamber with a gas mixture. The gas mixture can include at least one neutron sensitive fill gas and a quench gas including $BF_3$.

In another embodiment, the fill gas can have a thermal neutron absorption cross-section within the range from about 100 to 5600 barns.

In another embodiment, the fill gas can have a fast neutron total cross-section within the range from about 1 to 8 barns In another embodiment, the fill gas can be He-3. He-3 can be present in the gas mixture in an amount sufficient to provide a partial pressure within the range from about 1.5 Psia to about 150 Psia.

In another embodiment, the fill gas can be at least one of He-4, $H_2$, or $UF_6$.

In another embodiment, the gas mixture can further include at least one stopping gas configured to reduce the mean free path of primary ions within the gas mixture.

In another embodiment, the stopping gas can be at least one of Ar, Kr, or Xe.

In another embodiment, $BF_3$ can be present in the gas mixture in an amount sufficient to provide a partial pressure within the range from about 0.002 Psia to about 3.9 Psia.

DESCRIPTION OF DRAWINGS

These and other features will be more readily understood from the following detailed description taken in conjunction with the accompanying drawings, in which:

FIG. 2 is a flow diagram illustrating one exemplary embodiment of a method of preparing the proportional counter of FIG. 1.

Figure 1:
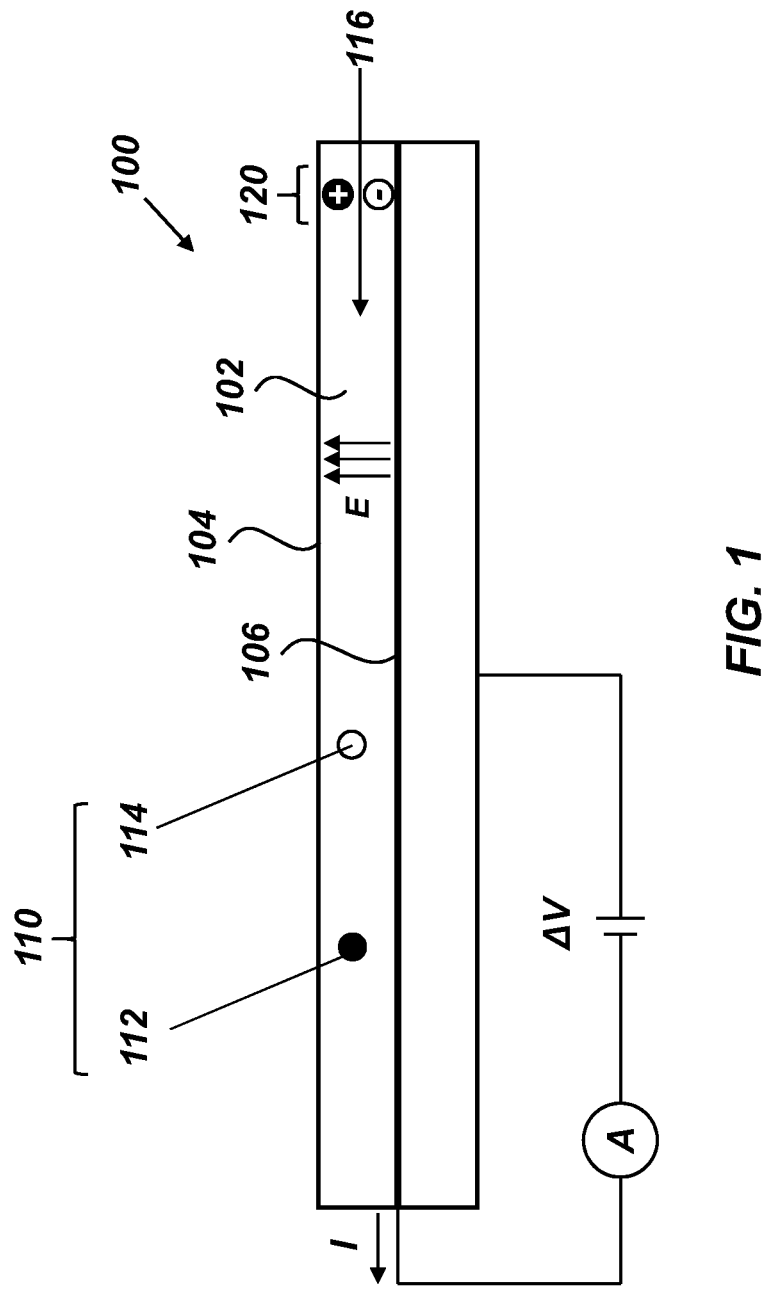
FIG. 1 is a diagram illustrating one exemplary embodiment of proportional counter including a gas mixture including an He-3 fill gas and a $BF_3$ quench gas.

It is noted that the drawings are not necessarily to scale. The drawings are intended to depict only typical aspects of the subject matter disclosed herein, and therefore should not be considered as limiting the scope of the disclosure.

DETAILED DESCRIPTION

A proportional counter is provided for detection of radiation (e.g., neutrons) that includes a novel gas mixture. As discussed in detail below, the proportional counter can include a gas mixture including a neutron sensitive fill gas and a quench gas including $BF_3$. In one aspect, the gas mixture provides improved sensitivity for detection of neutrons, as compared to gas mixtures without $BF_3$. In another aspect, decomposition products of the $BF_3$ quench gas are capable of recombining, providing the quench gas with effectively indefinite life.

FIG. 1 illustrates one exemplary embodiment of a proportional counter 100. As shown, the proportional counter 100 includes a chamber 102 having two electrodes (e.g., a cathode 104 and an anode 106) separated from one another. The chamber 102 can further contains, or be filled to contain, a gas mixture 110 under pressure. That is, the chamber 102 can include at least one port (not shown) configured to couple to a gas source for receiving the gas mixture 110 or components thereof. The chamber 102 can further include one or more seals (not shown) configured ensure that the chamber 102 is substantially fluid tight, inhibiting egress of the pressurized gas mixture 110.

In an embodiment the gas mixture 110 can include a fill gas 112 (e.g., a neutron sensitive gas) and a quench gas 114. The fill gas 112 can be configured to interact with, or be ionized by, incident radiation 116. The quench gas 114 can be configured to terminate pulse discharge.

In use, a voltage $\Delta V$ is applied between the electrodes 104, 106 to generate an electric field E therebetween.

Incident radiation 116 (e.g., a neutron) entering the proportional counter 100 can collide with a molecule of the fill gas 112 and ionizes it to produce an electron − (primary electron) and a positively charged atom or molecule +, collectively ion pair 120, also referred to herein as primary ions. The voltage ΔV is sufficient so that conditions within the chamber 102 correspond to the proportional region of the counter 100. In one aspect, the electric field strength is sufficiently high to prevent recombination of ion pairs, causing positive ions to drift towards the cathode and electrons towards the anode. In the vicinity of the anode, the field strength is also large enough to accelerate the primary electrons, causing ionization of additional atoms of the fill gas 112, generating further ion pairs (including secondary electrons). The electrons − collected at the anode 106 form the output (e.g., ion current I) of the proportional detector 100 and can be measured by an ammeter A or other current measuring device. Beneficially, in the proportional region, each ionizing particle produces only one avalanche. Thus, proportionality is provided between the number of events (ionizing particles) and the total ion current I. Additionally, the charge amplification provided by the avalanche improves the signal to noise ratio of the proportional detector 100 and reduces the amount of subsequent signal amplification required.

Embodiments of the present disclosure propose a gas mixture 110 that includes a neutron sensitive gas as the fill gas 112 (e.g., helium-3) and $BF_3$ as the quench gas 114. As discussed in detail below, this combination is counter to conventional wisdom as understood by one skilled in the art and provides advantages over use of organic gases as the quench gas 114.

Some early proportional detectors have employed boron tri-fluoride $BF_3$ as a fill gas. Boron-10 exhibits excellent thermal neutron capture cross-section, making is suitable for use to measure thermal neutron flux. In thermal neutron boron reaction:

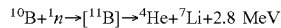
$$^{10}B + {}^1n \rightarrow [{}^{11}B] \rightarrow {}^4He + {}^7Li + 2.8 \text{ MeV}$$

boron-10 ($^{10}B$) absorbs a neutron ($^1n$) to yield boron-11 ($^{11}B$). Boron-11 subsequently decays into reaction products helium-4 ($^4He$) and lithium-7 ($^7Li$) and 2.8 MeV (gamma rays). The short range of the reaction products means that the total energy can be collected in a relatively short distance. This allows for discrimination of lower energy gamma rays from the thermal neutron signals in a relatively small package.

Use of $BF_3$ as the fill gas in proportional detectors has largely been supplanted by helium-3, however. In one aspect, as compared to $BF_3$, helium-3 exhibits a significantly higher capture cross-section. In another aspect, significant care can be required when handling $BF_3$, as it is hazardous (e.g., toxic by inhalation) and corrosive, as it can form highly corrosive hydrofluoric acid when dissolved in water. Thus, for many detection tasks, neutron detection is more easily performed using helium-3.

The quench gases used in combination with helium-3 are typically organic gases (e.g., carbon dioxide $CO_2$, methane $CH_4$, carbon tetrafluoride $CF_4$). In general, quenching action describes when the energy from the pulse is dissipated by the quench gas. This dissipation occurs when the molecules of the quench gas use the energy of the incident radiation to break apart (or dissociate) into their separate elements, rather than ionize or re-release another photon (as do other gases in the gas mixture).

While organic gases are suitable quenchers for many applications of the proportional counter, they can exhibit some drawbacks. In one aspect, these organic gases are consumed over the life of the detector due to the nature of their dissociation as they quench. That is, once these molecules have split, they are not capable of reforming. Furthermore, in some cases, the split molecules can result in deposition of carbon on internal components of the proportional counter and degrade its performance.

In another aspect, it will be appreciated that these organic gases function solely as quenchers. That is, they represent a portion of the total gas in the detector that is not sensitive to thermal neutrons. For detector designs that are limited by maximum pressure of the gas mixture 110, the amount of quench gas 114 must be carefully balanced by the sensitivity required for the desired detection application.

Accordingly, there exists a need for gas mixtures including different quench gases exhibiting improved performance as compared to the above-discussed organic gases. Embodiments of the present disclosure propose a gas mixture 110 that includes a neutron sensitive gas as the fill gas 112 (e.g., helium-3) and $BF_3$ as the quench gas 114. In certain embodiments, the only quench gas is $BF_3$. As further discussed below, use of $BF_3$ as the quench gas is unconventional, given acknowledged drawbacks of $BF_3$ as a fill gas. However, $BF_3$ offers compelling advantages when used in as the quench gas 114 in combination with the fill gas 112.

In general, $BF_3$ is an electronegative gas. Too much $BF_3$ can drive the voltage required for operation too high to be useable (e.g., out of the proportional range). That is, because of the quenching functionality of $BF_3$, the more that is added, the higher the voltage ΔV needed to operate as a detector for alpha particles ($^4He$). For this reason, the pressure of $BF_3$ in use is generally limited to about 1 atmosphere when used unmixed in a proportional counter.

In another aspect, too much $BF_3$ can slow the response of the counter. As an example, the speed with which the proportional counter collects all the charge from a given event is determined by the drift velocity of electrons in the fill gas, and the drift velocity changes for a given gas mixture. As $BF_3$ is not a gas that gives rise to relatively fast drift velocity, too much of it in the gas mixture can slow charge collection, and therefore limit the speed with which the proportional counter can resolve individual events In a further aspect, too much $BF_3$ can potentially alter the shape or number of pulses from a single event. Without being bound by theory, it is believed that the combination of low drift velocity and electronegativity of $BF_3$ results in failure to capture the full energy of the pulse in the same time period as the rest of the pulse.

In an additional aspect, as discussed above, helium-3 has a much higher cross-section for thermal neutron capture as compared to $BF_3$ and can be filled to higher pressures. Thus, in instances where the gamma field is low enough to permit use of helium-3, $BF_3$ provides no advantages if substituted for helium-3 as the fill gas to absorb thermal neutrons.

However, use of $BF_3$ as the quench gas 114 in the gas mixture 110, as compared to traditional organic gases, has a variety of advantages, discussed in detail below.

In one aspect, because $BF_3$ is a halogen quench agent, its decomposition products are capable of recombining. As a result, a negligible amount of $BF_3$ is consumed when quenching, giving it an effectively indefinite life, even in high-flux environments.

In another aspect, because $BF_3$ is at least thermal neutron sensitive, its use as the quench gas 114 serves to improve at least the total thermal neutron sensitivity of the proportional detector 100.

In a further aspect, as boron-10 deposits more energy per neutron interaction than helium-3, the presence of $BF_3$ can help to mitigate the sensitivity loss experienced by helium-3 proportional counters when employed in moderate gamma fields (e.g., about 10 to about 1000 R/hr). At these gamma radiation levels, the pulse height discrimination level should be raised to remove gamma interference. Accordingly, some fraction of helium-3 pulses can be discriminated out, but higher energy pulses from boron-10 would not be.

$BF_3$ can be present within the gas mixtures 110 in an amount sufficient to provide a partial pressure within the range from about 0.002 Psia to about 3.9 Psia. The lower bound represents the minimum partial pressure of $BF_3$ sufficient for quenching. This pressure corresponds to the pressures typically used for halogen quenching in a Geiger-Müller tube. The upper bound represents the maximum partial pressure of $BF_3$ before $BF_3$ effectively dominates over the fill gas 112. That is, before the operational characteristics of the gas mixture 110 approaches that of pure $BF_3$. It can be appreciated that these partial pressures are provide as examples and that the minimum/maximum partial pressure of $BF_3$ can adopt other values in view of detector size, detector construction, desired sensitivity, and maximum pressure.

Embodiments of the gas mixture can employ a variety of neutron sensitive gases as the fill gas 112 in combination with $BF_3$ as the quench gas 114. In certain embodiments, the neutron sensitive gas can be helium-3. As an example, helium-3 can be used for detection of relatively slow moving thermal neutrons (e.g., neutrons having an energy around about 0.025 eV). Helium-3 can be present in a mount sufficient to provide a partial pressure within the range from about 1.5 Psia to about 150 Psia. The minimum partial pressure represents an estimate of the minimum amount of helium-3 required for viable operation of the proportional counter 100. In contrast, above the maximum partial pressure, the increase in sensitivity drops dramatically for a given increase in helium-3 partial pressure. Thus, it is economically undesirable to fill above this maximum partial pressure.

In other embodiments, the neutron sensitive gas can be at least one of helium-4 ($^4$He), hydrogen $H_2$, or uranium hexafluoride $UF_6$. As an example, helium-4 and hydrogen can be used for detection of fast neutrons (e.g., neutrons having an energy within the range from about 1 MeV to about 20 MeV), where helium-3 is not suitable. Uranium hexafluoride can be used for detection of either thermal neutrons or fast neutrons. In further embodiments, the at least one neutron sensitive gas has a thermal neutron absorption cross-section within the range from about 100 barns to about 5600 barns. In additional embodiments, the at least one neutron sensitive gas has a fast neutron total cross-section with the range from about 1 barns to about 8 barns.

The gas mixture 110 can further include one or more stopping gases. The stopping gas is different from the quench gas 114. Notably, the quench gas 114 is configured to terminate the pulse, while the stopping gas has an ionization potential that allows for gas multiplication of the primary ions. Thus, in this context, stopping refers to the ability of the stopping gas to reduce the mean free path of primary ions (e.g., either or both of the ion pair 120) within the gas mixture 110. Examples of such stopping gases can include, but are not limited to, at least one of argon (Ar), krypton (Kr), or xenon (Xe).

In further embodiments, a method 200 for preparing a proportional counter is provided. FIG. 2 is a flow diagram illustrating one exemplary embodiment of the method 200. As shown, the method 200 can include operations 202-204. However, it can be appreciated that, in alternative embodiments, the method can include greater or fewer operations than illustrated in FIG. 2 and the operations can be performed in a different order than illustrated in FIG. 2.

In operation 202, a proportional counter is provided. In an embodiment, the proportional counter can be the proportional counter 100 of FIG. 1, including the chamber 102 having an anode and a cathode.

In operation 204, the chamber 102 can be filled with a gas mixture 110. The gas mixture 110 can include the fill gas 112 (e.g., at least one neutron sensitive gas) and the quench gas 114 (e.g., $BF_3$). Examples of the at least one neutron sensitive gas can include, but are not limited to, He-3, He-4, $H_2$, or $UF_6$). In an embodiment, the partial pressure of the fill gas 112 within the gas mixture 110 can be provided within the range from about 1.5 Psia to about 150 Psia. In a further embodiment, the partial pressure of $BF_3$ within the gas mixture 110 can be within the range from about 0.002 Psia to about 3.9 Psia.

In a further embodiment, the at least one neutron sensitive gas can be configured to detect thermal neutrons, fast neutrons, and/or combinations thereof. As an example, in one example, the at least one neutron sensitive gas can have a thermal neutron absorption cross-section within the range from about 100 to 5600 barns. As another example, the at least one neutron sensitive gas can have a fast neutron total cross-section within the range from about 1 to 8 barns.

In embodiments, the gas mixture 110 can also include at least one stopping gas. The at least one stopping gas can be configured to reduce a mean free path of primary ions within the gas mixture. The primary ions can be electrons or molecules of the fill gas 112 ionized by the incident radiation 116. Examples of the stopping gas can include, but are not limited to, Ar, Kr, or Xe.

Exemplary technical effects of the methods, systems, and devices described herein include, by way of non-limiting example a proportional counter including a novel gas mixture including a neutron sensitive gas and $BF_3$ as a quench gas. In one aspect, the gas mixture provides improved sensitivity for detection of neutrons, as compared to gas mixtures without $BF_3$. In another aspect, decomposition products of the $BF_3$ quench gas are capable of recombining, providing the quench gas with effectively indefinite life.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. "Approximately," "substantially, or "about" can include numbers that fall within a range of 1%, or in some embodiments within a range of 5% of a number, or in some embodiments within a range of 10% of a number in either direction (greater than or less than the number) unless otherwise stated or otherwise evident from the context (except where such number would impermissibly exceed 100% of a possible value). Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the descriptions herein and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A neutron proportional counter, comprising:
   a chamber comprising an anode and a cathode; and
   a gas mixture contained within the chamber, the gas mixture comprising:
     at least one neutron sensitive fill gas; and
     a quench gas comprising $BF_3$.

2. The proportional counter of claim 1, wherein the fill gas has a thermal neutron absorption cross-section within the range from about 100 to 5600 barns.

3. The proportional counter of claim 1, wherein the fill gas has a fast neutron total cross-section within the range from about 1 to 8 barns.

4. The proportional counter of claim 1, wherein the fill gas comprises He-3.

5. The proportional counter of claim 4, wherein He-3 is present in the gas mixture in an amount sufficient to provide a partial pressure within the range from about 1.5 Psia to about 150 Psia.

6. The proportional counter of claim 1, wherein the fill gas comprises at least one of He-4, $H_2$, or $UF_6$.

7. The proportional counter of claim 1, wherein the gas mixture further comprises at least one stopping gas configured to reduce the mean free path of primary ions within the gas mixture.

8. The proportional counter of claim 7, wherein the stopping gas comprises at least one of Ar, Kr, or Xe.

9. The proportional counter of claim 1, wherein $BF_3$ is present in the gas mixture in an amount sufficient to provide a partial pressure within the range from about 0.002 Psia to about 3.9 Psia.

10. A method of preparing neutron proportional counter, comprising:
    providing a neutron proportional counter comprising a chamber comprising an anode and a cathode; and
    filling the chamber with a gas mixture comprising at least one neutron sensitive fill gas and a quench gas comprising $BF_3$.

11. The method of claim 10, wherein the fill gas has a thermal neutron absorption cross-section within the range from about 100 to 5600 barns.

12. The method of claim 11, wherein the fill gas has a fast neutron total cross-section within the range from about 1 to 8 barns.

13. The method of claim 11, wherein the fill gas comprises He-3.

14. The method of claim 13, wherein He-3 is present in the gas mixture in an amount sufficient to provide a partial pressure within the range from about 1.5 Psia to about 150 Psia.

15. The method of claim 11, wherein the fill gas comprises at least one of He-4, $H_2$, or $UF_6$.

16. The method of claim 11, wherein the gas mixture further comprises at least one stopping gas configured to reduce the mean free path of primary ions within the gas mixture.

17. The method of claim 16, wherein the stopping gas comprises at least one of Ar, Kr, or Xe.

18. The method of claim 11, wherein $BF_3$ is present in the gas mixture in an amount sufficient to provide a partial pressure within the range from about 0.002 Psia to about 3.9 Psia.

* * * * *